(12) United States Patent
Suzuki et al.

(10) Patent No.: US 6,811,275 B2
(45) Date of Patent: Nov. 2, 2004

(54) SPREAD ILLUMINATING APPARATUS WITH PLURALITY OF LIGHT CONDUCTIVE BARS

(75) Inventors: Shingo Suzuki, Iwata-gun (JP); Toru Kunimochi, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 13 days.

(21) Appl. No.: 10/199,041

(22) Filed: Jul. 22, 2002

(65) Prior Publication Data

US 2003/0021099 A1 Jan. 30, 2003

(30) Foreign Application Priority Data

Jul. 24, 2001 (JP) ........................................ 2001-223384

(51) Int. Cl.[7] .............................................. F21V 7/04
(52) U.S. Cl. .......................................... 362/31; 362/27
(58) Field of Search ....................................... 362/31, 27

(56) References Cited

U.S. PATENT DOCUMENTS 6,286,970 B1 * 9/2001 Egawa et al. ................. 362/31
6,343,867 B1 * 2/2002 Suzuki et al. ................. 362/31
6,431,716 B1 * 8/2002 Kusakabe ...................... 362/31
6,447,135 B1 * 9/2002 Wortman et al. .............. 362/31

FOREIGN PATENT DOCUMENTS

JP         A 2000-11723         1/2000

* cited by examiner

Primary Examiner—Stephen Husar
Assistant Examiner—James W Cranson
(74) Attorney, Agent, or Firm—Oliff & Berridge, PLC

(57) ABSTRACT

In a spread Illuminating apparatus basically comprising a light conductive plate and a lamp, the lamp comprises at least two light conductive bars and a spot-like light source disposed on one or both end surfaces of the light conductive bars, and is disposed close a side surface of the light conductive plate. An optical path conversion means comprising grooves and flat portions is formed on a side surface of each of the at least two light conductive bars. Light-and-dark striping generated on the light conductive plate by light reflected by one optical path conversion means of one light conductive bar of the at least two is corrected by light reflected by the other optical path conversion means of the other light conductive bars.

10 Claims, 4 Drawing Sheets

SPREAD ILLUMINATING APPARATUS WITH PLURALITY OF LIGHT CONDUCTIVE BARS

BACKGROUND OF THE INVENTION

1. Field of the Invention

The present invention relates to a spread illuminating apparatus, and particularly to a spread illuminating apparatus used as an illuminating means for a liquid crystal display.

2. Description of the Related Art

A liquid crystal display characterized by its small occupied volume, low-profile and light-weight has been extensively used in electric products including cellular phones and personal computers and the demand thereof has been increasing. However, since a liquid crystal of the liquid crystal display (hereinafter, referred to as "LCD") does not emit light by itself, a separate illuminating means for irradiating the LCD is needed besides the LCD when used in dark places where sunlight or room light is not satisfactorily available. Thus, this illuminating means is required not only to be small in size and in power consumption, but also to project high quality images on an observation surface. In particular in recent years, a sheet-like spread illuminating apparatus of side light type (light conductive plate type) is often applied as an illuminating means.

FIG. 5 shows an embodiment of a conventional spread illuminating apparatus of side light type, which aimed for a uniform spread light emission (disclosed in the Japanese Unexamined Patent Application Publication No. 2000-11723) described hereinafter.

A spread illuminating apparatus 1' disposed over an upper surface of a reflection type liquid crystal element L is generally composed of a flat rectangular light conductive plate 2 made of a light-transmissible material, a lamp 4 disposed close to a side surface 3 thereof, and a light reflection member 12 (a reflector) covering the lamp 4 and two edges of top and bottom surfaces of one end of the light conductive plate 2.

The lamp 4 is composed of a light conductive bar 7 and light sources (shaped spot-like) 9 and 9 such as light emitting diodes disposed at both end surfaces 8 and 8 of the light conductive bar 7. An optical path conversion means 11 including grooves 15 substantially triangular in section and flat portions 16 formed therebetween is formed on a side surface 14 opposite to a surface 13 facing the side surface 3 of the light conductive plate 2. Light traveling inside the light conductive bar 7 tends to be reflected mostly by means of each inclined surface forming each of the grooves 15 so as to advance in the direction substantially perpendicular to the surface 13. Comparing with the flat portions 16, the grooves 15 reflect more amount of light entering the light conductive plate 2 after passing through the side surface 13. Thus, the ratio of the width of each of the grooves 15 to the width of each of the flat portions 16 is set to be proportional to the distance from each of the ends 8 of the light conductive bar 7. Since the width of each of the grooves 15 in the optical path conversion means 11 is formed in consideration of the distance from the light source 9, the uniform emission of light from the surface 13 can be realized regardless of the fact that the light sources are each disposed at each of the end surfaces 8, 8 of the light conductive bar 7.

In this connection, the configuration of the optical path conversion means 11 is not limited to the above embodiment, and the optical path conversion means 11 may comprise light scattering portions with minute ruggedness formed by roughening the surface thereof and flat portions without ruggedness.

A light reflection pattern 17 is formed on an upper surface 6 of the light conductive plate 2 in parallel to the side surface 3. The light reflection pattern 17 comprises a plurality of grooves 18 each substantially triangular in section and flat portions 19 adjacent thereto, and the grooves 18 is spaced unevenly in order to realize the uniform spread light emission of the light conductive plate 2 irrespective of the distance from the lamp 4. This means that the ratio of the width (occupied area) of each of the grooves 18 to the width (occupied area) of each of the flat portions 19 is set to be proportional to the distance from the end surface 3 of the light conductive plate 2.

The light reflection member 12 covers longitudinal surfaces of the light conductive bar 7 except the surface 13 facing the light conductive plate 2, and also covers two edges of upper and lower surfaces of the one end of the light conductive plate 2 which is close to the light conductive bar 7 in order to recover light leaking out of the conductive bar 7 and to make an efficient utilization of the light traveling within the light conductive bar 7. The light reflection member 12 formed substantially U-shaped has, on its surfaces covering the light conductive bar 7 (inner surfaces), any one of a film on which a metal such as silver is vapor-deposited, a hard resin with a white film adhered to its inner surface, and a bent metal sheet such as a bent aluminum sheet, and a bent stainless steel sheet.

However, in the spread illuminating apparatus with the above configuration, there is a shortcoming that light-and-dark stripes are generated in the direction orthogonal to the side surface 3 of the light conductive plate 2 when observing the screen, which is due to the optical path conversion means 11 formed on the light conductive bar 7. That is, most of light reflected by the light scattering portions 15 of the optical path conversion means 11 enters the light conductive plate 2 after being emitted from the side surface 13, whereas most of light reflected by the flat portions 16 is totally reflected and travels within the light conductive bar 7 without being emitted from the side surface 13. Accordingly, it is, in a strict sense, impossible to make a luminous intensity at the side surface 13 become uniform due to the above design pattern comprising the light scattering portions 15 and the flat portions 16. As a result, the lightness of the light entering the light conductive plate 2 becomes non-uniform, and the light-and-dark stripes orthogonal to the end surface 3 are generated on the observational screen. One of the countermeasures therefor is to make the light scattering portions 15 and the flat portions 16 more minute to the level that the light-and-dark stripes can not be visually recognized. However, it is difficult to obtain a desired machining accuracy by employing this method.

Another countermeasure therefor is that, as shown in FIG. 6, a diffusion plate 20 is interposed between the light conductive bar 7 and the light conductive plate 2 so as to make uniform the luminance of the light entering the light conductive plate 2. In the diffusion plate 20 a light diffusion unit containing a light diffusive substance is formed on a plate-like supporting base. The light emitted from the side surface 13 of the light conductive bar 7 is diffused when passing through the diffusion plate 20 so that the luminance of the light entering the side surface 3 of the light conductive plate 2 can be made substantially uniform (disclosed in the Japanese Unexamined Patent Application Publication No. 2000-231814).

A spread illuminating apparatus 1" with the diffusion plate 20 shown in FIG. 6 is effective for making the luminous intensity uniform on an observation surface. However, the light emitted from the side surface 13 and diffused during passing through the diffusion plate 20 has a lower light transmissivity for entering the side surface 3 of the light conductive plate 2, so that more power consumption is needed to obtain the predetermined luminance on the observation screen. Moreover, due to the complicated manufacturing steps, the working efficiency will be accordingly decreased.

In addition, even if the optical path conversion means is spaced as narrowly as possible in the hope of obtaining the desired machining accuracy without using any diffusion plate, it is almost impossible to prevent the light-and-dark stripes from being generated on the screen.

Although the details are given later, light-and-dark stripes having longer pitches than the aforementioned stripes are also observed so that countermeasures therefor are also necessary.

SUMMARY OF THE INVENTION

The present invention has been made in light of the above problems, and it is an object of the present invention to provide a spread illuminating apparatus which can easily obtain the uniform spread lightness over the entire screen without increasing the power consumption.

In order to solve the above problems, according to a first aspect of the present invention, a spread illuminating apparatus comprises: a light conductive plate which is made of a light-transmissible material and which has a light reflection pattern formed on a surface thereof; a lamp which comprises at least two light conductive bars arranged in parallel with each other and disposed along and close to a side surface of the light conductive plate, and a spot-like light source disposed over respective one end surfaces of the light conductive bars; and optical path conversion means each formed on side surface of each of the light conductive bars opposite to a side surface facing the side surface of the light conductive plate and adapted to reflect light emitted from the light source. In this structure, the optical path conversion means are arranged such that light-and-dark striping to appear on the light conductive plate due to light reflected by one optical path conversion means of one light conductive bar of the at least two is corrected by light reflected by the other optical path conversion means of the other light conductive bar.

In accordance with the present invention, light emitted from the light source is reflected toward the light conductive plate by the optical path conversion means formed on one end surface of each light conductive bar. Light-and-dark striping appears on the light conductive plate due to light reflected by the one optical path conversion means of the one light conductive bar. The light-and-dark striping is corrected by the other optical path conversion means of the other light conductive bar such that dark portions of the striping generated by the one optical path conversion means is matched with light portions generated by light reflected by the other optical path conversion means, and vice versa, whereby uniform spread light emission over the entire screen can be achieved.

And, according to a second aspect of the present invention, in the first aspect, the optical path conversion means each comprise a plurality of grooves and a plurality of flat portions adjacent thereto. Thus, light emitted from the light source is not only efficiently reflected toward the light conductive plate, but also reflected in a substantially uniform manner irrespective of the distance from the spot-like light source.

Further, according to a third aspect of the present invention, in the first aspect, the optical path conversion means each comprise a plurality of grooves shaped triangular in section and arranged continuously so that light emitted from the light source is not only efficiently reflected toward the light conductive plate, but also reflected in a substantially uniform manner irrespective of the distance from the light source.

Furthermore, according to a fourth aspect of the present invention, in the second or third aspect, the other optical path conversion means has one of, or a combination of the following three configurations: the grooves are formed only at positions corresponding to dark portions of the light-and-dark striping to appear on the light conductive plate due to the one optical path conversion means; the grooves have an increased depth at positions corresponding to dark portions; and the grooves have a decreased pitch at positions corresponding to the dark portions. With these configurations, the amount of light reflected toward the light conductive plate can be increased by the other optical conversion means at the dark portions generated by the one optical conversion means, thereby preventing the light-and-dark striping on the light conductive plate.

Still further, according to a fifth aspect of the present invention, in any one of the first to fourth aspects, the light source is disposed on one or both end surfaces of the light conductive bars disposed in parallel with each other so as to cover the end surfaces of all of the light conductive bars. Light emitted from the light source can efficiently enter each of the light conductive bars by setting the sum of the widths of all of the light conductive bars to be substantially equal to the width of the light source so that the light source can confront entirely the end surfaces of all of the light conductive bars.

Finally, according to a sixth aspect of the present invention, in any one of the first to fifth aspects, the one light conductive bar has a larger width than the other light conductive bar. The light-and-dark striping to otherwise appear on the light conductive plate can be corrected by appropriately setting the width of the other light conductive bar considering a balance with the amount of light reflected by the one light conductive bar generating the light-and-dark striping.

DESCRIPTION OF THE PREFERRED EMBODIMENTS

The preferred embodiments of a spread illuminating apparatus in accordance with the present invention will be hereinafter explained with reference to FIGS. 1 to 4. The components identical with or corresponding to those in the conventional spread illuminating apparatus are represented by the same reference numbers and the detailed description thereof is omitted.

Figure 1:
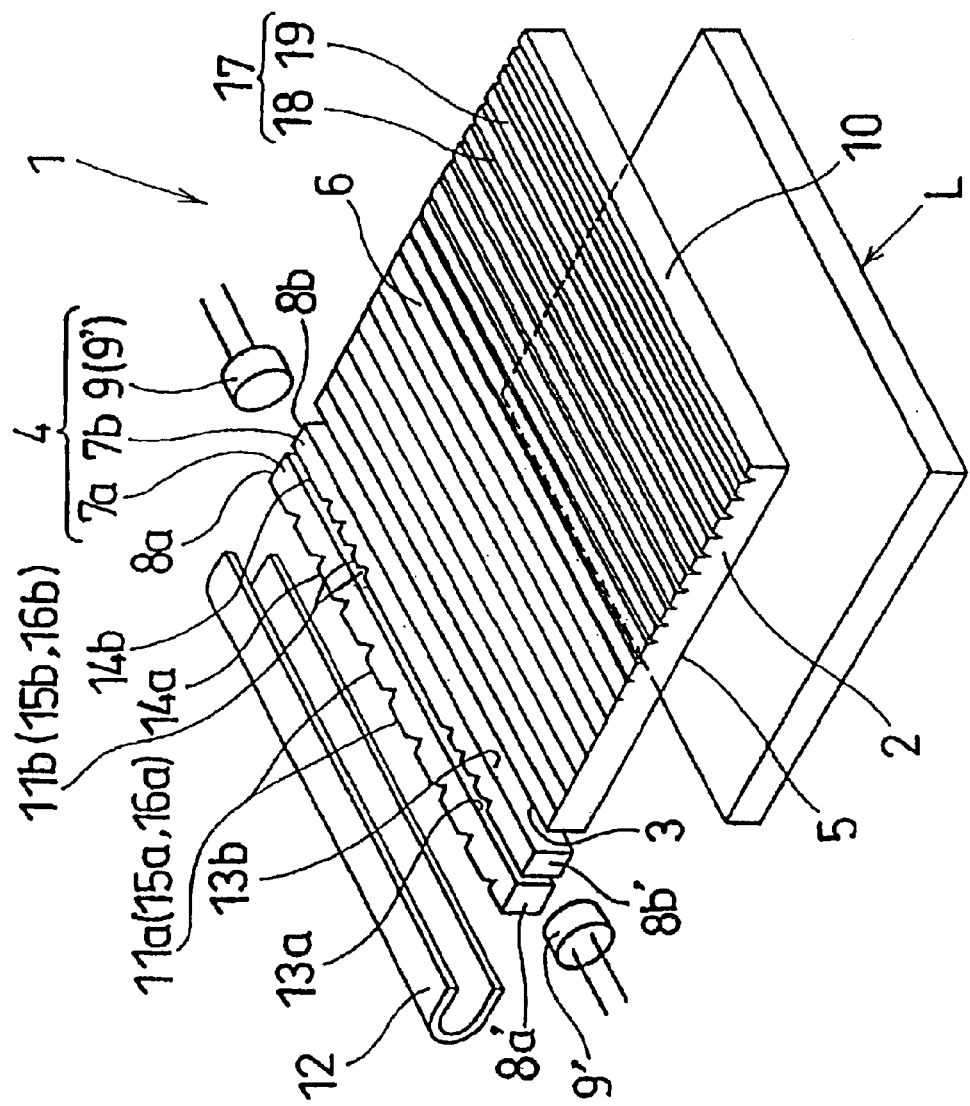
FIG. 1 is an exploded perspective view of an embodiment of a spread illuminating apparatus according to the present invention.

Referring to FIG. 1, a light source 4 comprises light conductive bars 7a and 7b, and spot-like light sources 9 and 9' facing end surfaces 8a and 8b and end surfaces 8a' and 8b' respectively, and 8a and 8a' are both ends of the light conductive bar 7a, and 8b and 8b' are both ends of the light conductive bar 7b. The light conductive bars 7a and 7b are disposed in parallel with each other, with a slight gap, along a side surface 3 of a light conductive plate 2, and optical path conversion means 11a and 11b to reflect light emitted from the light sources 9 and 9' are respectively disposed on side surfaces 14a and 14b of the light conductive bars 7a and 7b opposite to side surfaces 13a and 13b facing the side surface 3. Each unit of the optical path conversion means 11a and 11b comprises each one of grooves 15a and 15b substantially triangular in section (the grooves are also referred to as light reflection portions) and each one of flat portions 16a and 16b disposed adjacent thereto.

The optical path conversion means 11a of the light conductive bar 7a is set so that a pitch between any two adjacent grooves of the grooves 15a is, by degrees, inversely proportional to a distance from the respective light sources 9 and 9', and as a result, the pitch formed substantially in the center of the light conductive bar 7a is shortest. This is because luminance which is inversely proportional to the distance from the respective light sources 9 and 9' can be supplemented by forming more number of grooves in the grooves 15a per unit length of the light conductive bar 7a, in other words, by increasing the amount of light which is reflected by the grooves 15a and travels toward the light conductive plate 2. As a result, the whole portion of the light conductive bar 7a can reflect light toward the light conductive plate 2 as a substantially uniform spread emission light irrespective of the distance from the respective light sources 9 and 9'.

On the other hand, the optical path conversion means 11b of the light conductive bar 7b is disposed so as to realize more uniform spread light emission by preventing light-and-dark stripes generated by the light reflection of the optical path conversion means 11a of the light conductive bar 7a.

From now on, a detailed mechanism of light emitted from one light source and entering the light conductive bar, reflected by the optical path conversion means, and generating light-and-dark stripes on the light conductive plate 2 will be explained with reference to FIG. 3.

Figure 3:
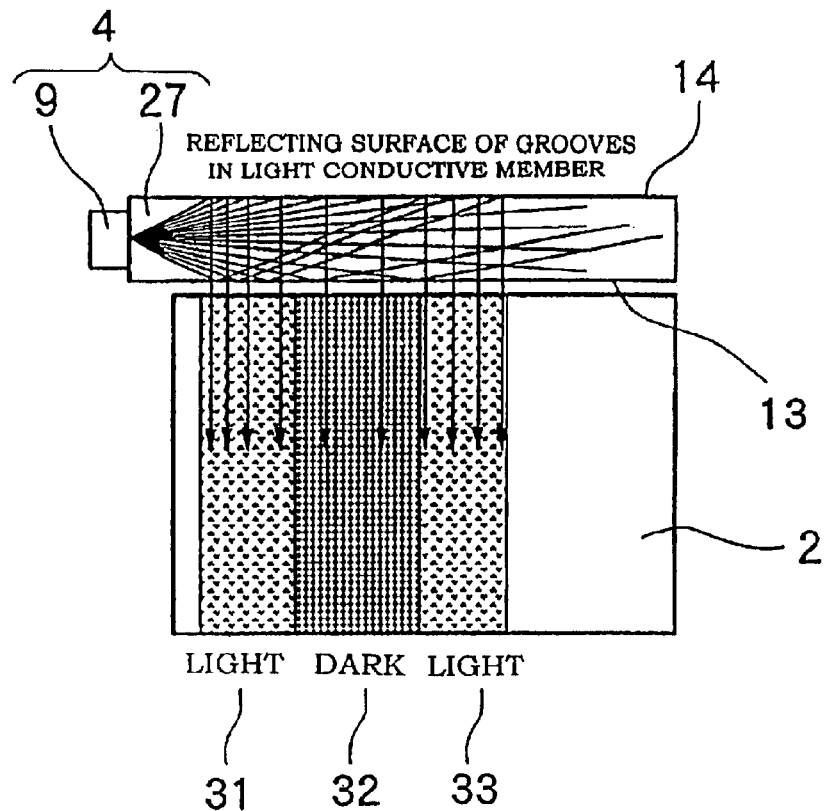
FIG. 3 is a schematic representation of light emitted from a spot-like light source.

A spread illuminating apparatus shown in FIG. 3 is generally composed of a light conductive plate 2 and a bar-like lamp. The bar-like lamp comprises a light conductive bar 27 and a spot-like light source 9 disposed on an end surface of the light conductive bar 27. An optical path conversion means comprising grooves and flat portions is formed on a side surface 14 of the light conductive bar 27 in order to reflect light traveling in the light conductive bar 27 toward the light conductive plate 2 in a substantially uniform manner (not shown).

Light emitted from the light source 9 first travels radially within the light conductive bar 27, then is reflected by the side surfaces 13 and 14 thereof (arrows indicate light reflected by the side surface 14 and guided toward the light conductive plate 2). More amount of light per unit area is directly reflected by the side surface 14 at the position relatively close to the light source 9 (more number of arrows are indicated), which generates a first light portion 31. The amount of light directly reflected by the side surface 14 is inversely proportional to the distance from the light source 9; however, an area where light directly reflected by the side surface 13 is re-reflected by the side surface 14 appears. This re-reflected light is added to the light directly reflected by the side surface 14 (the number of arrows is increased), and a second light portion 33 is generated. An area between these two light areas 31 and 33 forms a dark portion 32, and as a result, the light-and-dark stripes are generated on the light conductive plate 2.

Figure 2:
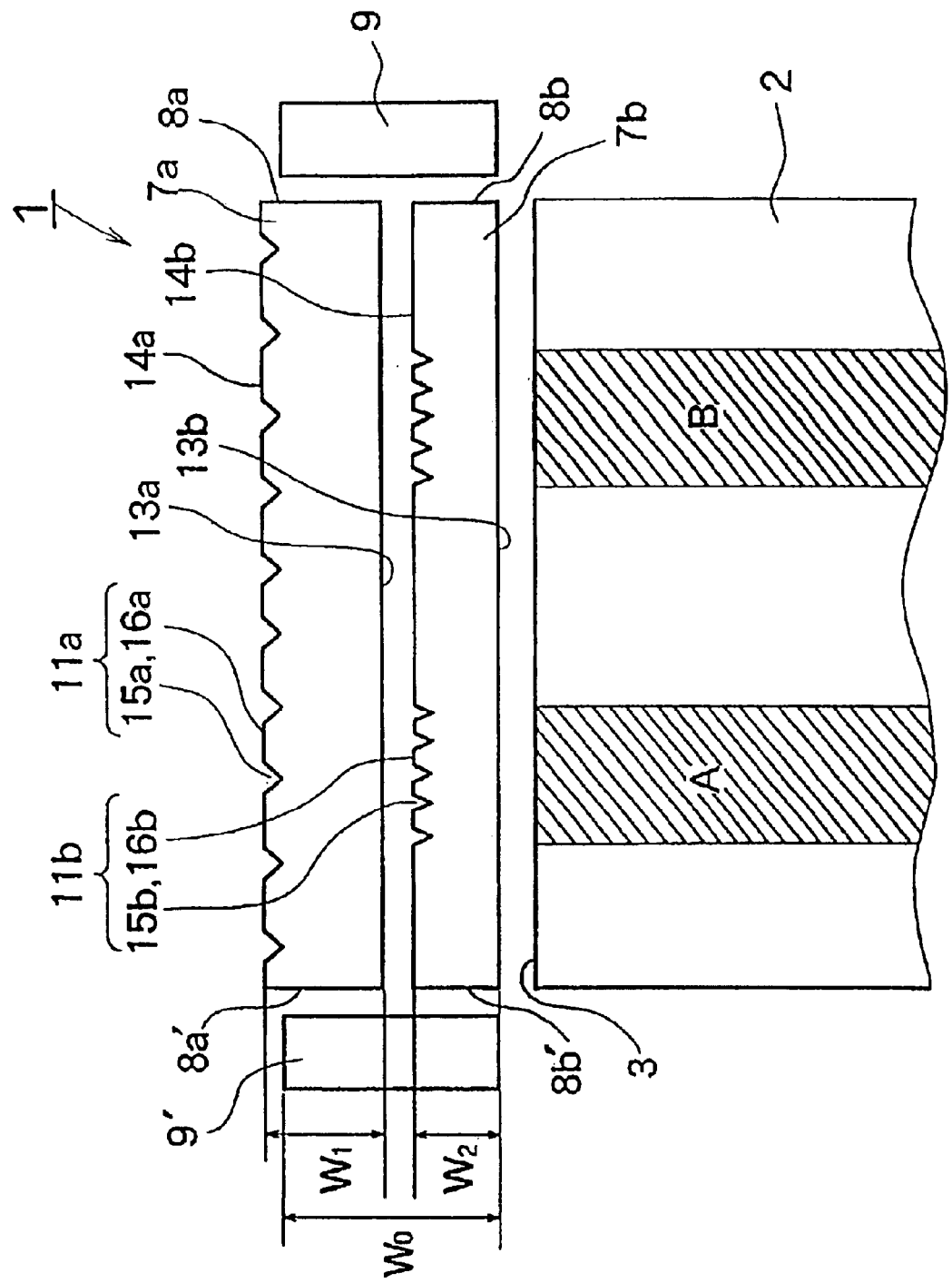
FIG. 2 shows a light source and a part of a light conductive plate constituting the spread illuminating apparatus in FIG. 1.

Due to the above-described mechanism, dark portions are generated in areas A and B on the light conductive plate 2 in the spread illuminating apparatus 1 having the spot-like light sources 9 and 9' on the both ends of the light conductive bar 7a as shown in FIG. 2 (here, only two dark portions which are conspicuous are described although, strictly speaking, other light-and-dark stripes are present).

Therefore, the optical path conversion means 11b of the light conductive bar 7b is disposed so that the dark portions of the areas A and B generated on the light conductive plate 2 due to the light reflection by the optical path conversion means 11a of the light conductive bar 7a can be prevented. In other words, grooves 15b comprising the optical path conversion means 11b of the light conductive bar 7b are disposed in each of areas corresponding to the dark areas A and B on the side surface 14b of the light conductive bar 7b. As a result, the amount of light reflected toward the dark areas A and B of the light conductive plate 2 is increased, thereby the dark portions of the areas A and B can be prevented. In short, the dark portions of the areas A and B on the light conductive plate 2 can be prevented by adding the light portions generated by the light conductive bar 7b to the dark portions generated by the light conductive bar 7a.

For preventing the dark portions caused by the light conductive bar 7a, the grooves 15b formed on the side surface 14b of the light conductive bar 7b are formed only in the areas corresponding to the dark areas A and B. However, the present invention is not limited thereto, and alternatively, for example, the optical path conversion means 11b may be provided over the entire portion of the side surface 14b of the light conductive bar 7b in order not only to prevent the generation of the dark portions in the areas A and B but also to efficiently reflect light entering the light conductive bar 7b from the light sources 9 and 9' toward the light conductive plate 2, and in addition, the grooves 15b corresponding to the dark areas A and B may be formed deeper than the other grooves. Further, the optical path conversion means 11b may be provided over the entire portion of the side surface 14b of the light conductive bar 7b as same as the above alternative, but the pitch between any two adjacent grooves of the grooves 15b in each of the areas corresponding to the dark areas A and B may be formed shorter than that of the other grooves. Or, both alternatives explained above may be applied at the same time. In FIG. 2, W1 denotes the width (also referred to as the width on the shorter side) of the light conductive bar 7a, W2 denotes the width (also referred to as the width on the shorter side) of the light conductive bar 7b, and W0 denotes the width of each of the spot-like light sources 9 and 9'. A sum of the width W1 and the width W2 of the respective light conductive bars is set to be substantially equal to the width W0 of each of the spot-like light sources 9 and 9', and the spot-like light source 9 is disposed substantially facing each of the end surfaces 8a and 8b of the respective light conductive bars 7a and 7b, and the spot-like light source 9' is disposed substantially facing each of the end surfaces 8a' and 8b'. As a result, light emitted from each of the light sources 9 and 9' efficiently enters each of the light conductive bars 7a and 7b. Further, since the sum of the width W1 and the width W2 of the respective light conductive bars is set to be substantially equal to the width of each of the spot-like light sources 9 and 9', the spot-like light sources 9 and 9' of the same type as that of a conventional one can be used, and therefore, the number of the light sources to be used need not be increased, and the cost can be saved. In addition, the size of the lamp 4 need not be increased, either. Although the light conductive bars 7a and 7b are separately indicated for an easy understanding of the structure thereof, the actual gap therebetween is very small.

Since the light conductive bar 7b is supplementarily provided in order to prevent the generation of the light-and-dark stripes by the reflection of the light conductive bar 7a, the provision thereof must not decrease the amount of light from the light conductive bar 7a to be reflected toward the light conductive plate 2. Thus, in order to efficiently reflect light entering the light conductive bar 7a from each of the light sources 9 and 9' toward the light conductive plate 2 and to achieve the high luminance of the light conductive plate 2, the light conductive bar 7a, the optical path conversion means 11a, or the like should be formed in a predetermined size, and the width W2 of the light conductive bar 7b must not be set to be more than the width W1 of the light conductive bar 7a (W2≦W1).

Further, in this embodiment, the light conductive bar 7b of the light conductive bars being disposed in parallel with each other, with a slight gap, along the light conductive plate 2 is disposed adjacent to the light conductive plate 2, and the light conductive bar 7a is disposed adjacent to the light conductive bar 7b. However, the light conductive bars 7a and 7b may be disposed at reverse positions. In spite of this, the same effect can be obtained. Further, the direction of disposition of a plurality of light conductive bars is not limited to the plane direction of the light conductive plate 2, and the plurality of light conductive bars may be disposed in parallel with each other, with a slight gap, in the thickness direction of the light conductive plate 2.

Further, the number of the light conductive bars being disposed in parallel with each other, with a slight gap, is not limited to two, and three or more light conductive bars may be disposed in parallel with each other. In this configuration, at least two light conductive bars can be used as the light conductive bars for preventing the generation of light-and-dark stripes, and the difference between lightness and darkness can be further reduced, and the luminance can be more uniform.

Figure 4:
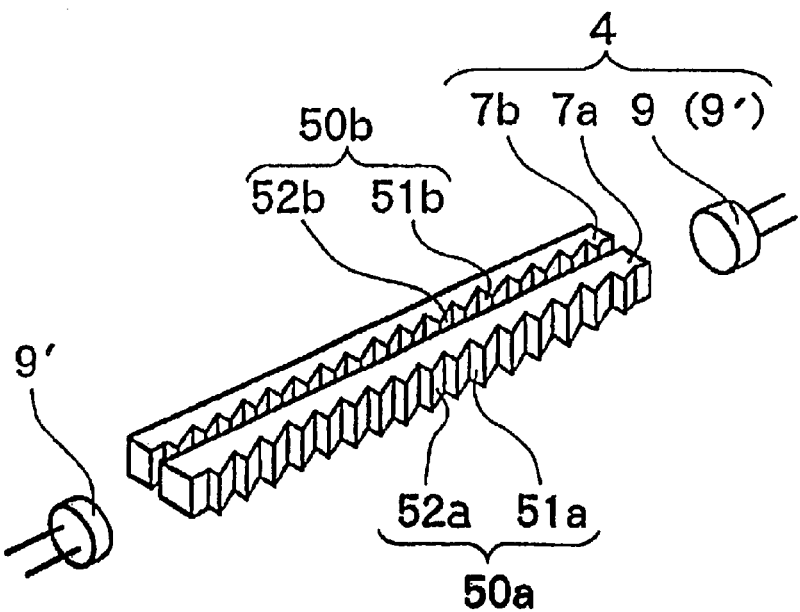
FIG. 4 shows an embodiment of an optical path conversion means formed on a light conductive bar according to the present invention.
Figure 5:
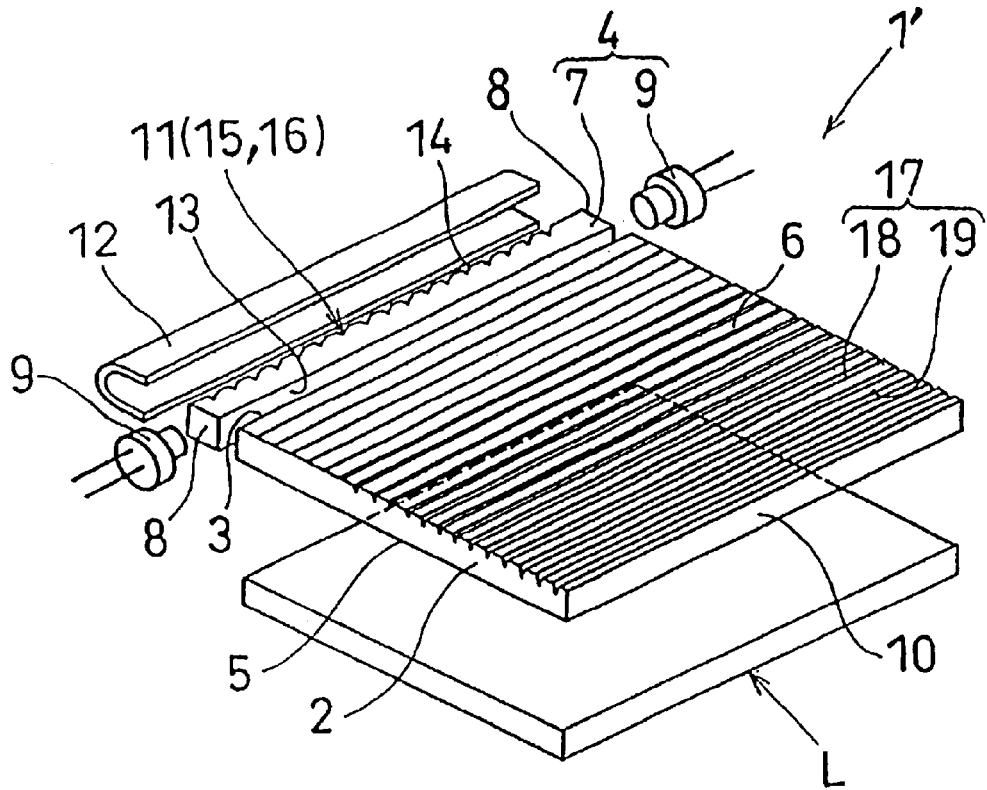
FIG. 5 is an exploded perspective view of an embodiment of a conventional spread illuminating apparatus.
Figure 6:
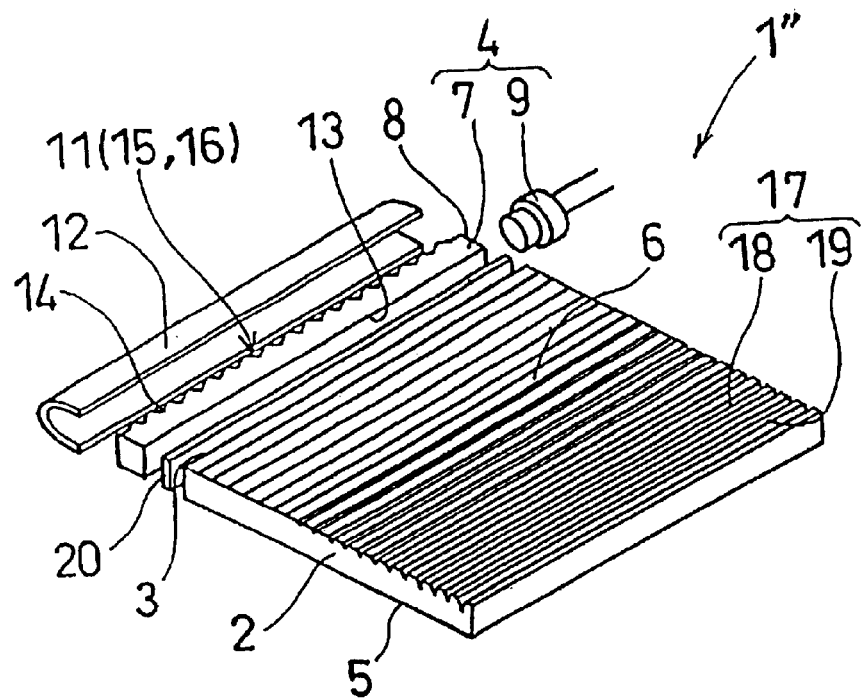
FIG. 6 is an exploded perspective view of another embodiment of a conventional spread illuminating apparatus.

FIG. 4 shows another embodiment of optical path conversion means formed on the light conductive bars 7a and 7b. An optical path conversion means 50a having successively formed grooves triangular in section comprising two inclined surfaces 51a and 52a, and an optical path conversion means 50b having successively formed grooves triangular in section comprising two inclined surfaces 51b and 52b are respectively disposed on respective end surfaces of the light conductive bars 7a and 7b being disposed in parallel with each other, with a slight gap. In every embodiment mentioned above, the light sources are disposed on both end surfaces of the light conductive bars. However, the same effect can be obtained even in a configuration in which the light source is disposed only in either end surface. Further, a plurality of light conductive bars do not always have to be separated from each other, and adjacent two light conductive bars may be coupled with each other on not only both ends of the adjacent light conductive bars but also at portions having no grooves, and accordingly, the plurality of light conductive bars may be integrated with each other.

Although the optical path conversion means shown in FIGS. 1 and 4 both comprise optical path conversion units of the same configuration (a configuration comprising grooves and flat portions or a configuration of successive grooves comprising two inclined surfaces) disposed on the light conductive members 7a and 7b, the configuration is not limited thereto, and the optical path conversion units of different configuration may be formed on each light conductive bar. Further, in place of the grooves constituting the optical path conversion means, light scattering portions may be formed by applying a white paint. The uniform spread light emission having high luminance can also be realized in these embodiments, by considering the width and the depth of each of the grooves, or an area or the like of the paint to be applied.

In FIG. 1, the spread illuminating apparatus is frontlight type but not limited thereto, and a similar effect can be obtained when applied to a spread illuminating apparatus of backlight type.

What is claimed is:

1. A spread illuminating apparatus comprising:
   a light conductive plate made of a light-transmissible material and having a light reflection pattern on a surface thereof;
   a lamp comprising at least two light conductive bars arranged in parallel with each other and disposed along and close to a side surface of said light conductive plate, and a spot-like light source disposed over respective one end surfaces of said at least two light conductive bars; and
   optical path conversion means each formed on a side surface of each of said at least two light conductive bars opposite to a side surface facing said side surface of said light conductive plate and adapted to reflect light emitted from said spot-like light source, said optical path conversion means being arranged such that light-and-dark striping to appear on said light conductive plate due to light reflected by one optical path conversion means of one light conductive bar of said at least two is corrected by light reflected by the other optical path conversion means of the other light conductive bar;
   wherein said other optical path conversion means of said other light conductive bar has one of, or a combination of following three configurations; said grooves are formed only at positions corresponding to dark portions of said light-and-dark striping to appear on said light conductive plate due to said one optical path conversion means of said one light conductive bar; said grooves have an increased depth at positions corresponding to said dark portions; and said grooves have a decreased pitch at portions corresponding to said dark portions.

2. A spread illuminating apparatus according to claim 1, wherein said optical path conversion means each comprise a plurality of grooves and a plurality of flat portions adjacent to said grooves.

3. A spread illuminating apparatus according to claim 1, wherein said optical path conversion means each comprise a plurality of grooves shaped triangular in section and arrayed continuously.

4. A spread illuminating apparatus according to claim 1, wherein said spot-like light source is disposed on one or both end surfaces of said at least two light conductive bars so as to cover said end surfaces of all of said at least two light conductive bars.

5. A spread illuminating apparatus according to claim 1, wherein said one light conductive bar has a larger width than said the other light conductive bar.

6. A spread illuminating apparatus according to claim 2, wherein said spot-like light source is disposed on one or both end surfaces of said at least two light conductive bars so as to cover said end surfaces of all of said at least two light conductive bars.

7. A spread illuminating apparatus according to claim 3, wherein said spot-like light source is disposed on one or both end surfaces of said at least two light conductive bars so as to cover said end surfaces of all of said at least two light conductive bars.

8. A spread illuminating apparatus according to claim 2, wherein said one light conductive bar has a larger width than said the other light conductive bar.

9. A spread illuminating apparatus according to claim 3, wherein said one light conductive bar has a larger width than said the other light conductive bar.

10. A spread illuminating apparatus according to claim 4, wherein said one light conductive bar has a larger width than said the other light conductive bar.

* * * * *

UNITED STATES PATENT AND TRADEMARK OFFICE
CERTIFICATE OF CORRECTION

PATENT NO. : 6,811,275 B2
DATED : November 2, 2004
INVENTOR(S) : Shingo Suzuki and Toru Kunimochi It is certified that error appears in the above-identified patent and that said Letters Patent is hereby corrected as shown below:

<u>Column 8,</u>
Line 48, delete "said"

Signed and Sealed this

First Day of March, 2005

JON W. DUDAS
*Director of the United States Patent and Trademark Office*